Aug. 13, 1935.   H. F. RITTER   2,011,081
COILABLE METAL MEASURING TAPE
Filed April 9, 1935
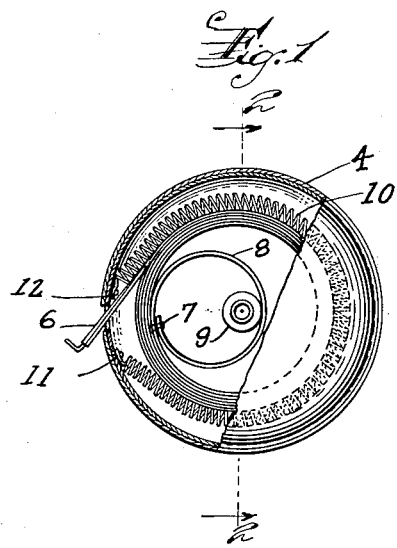
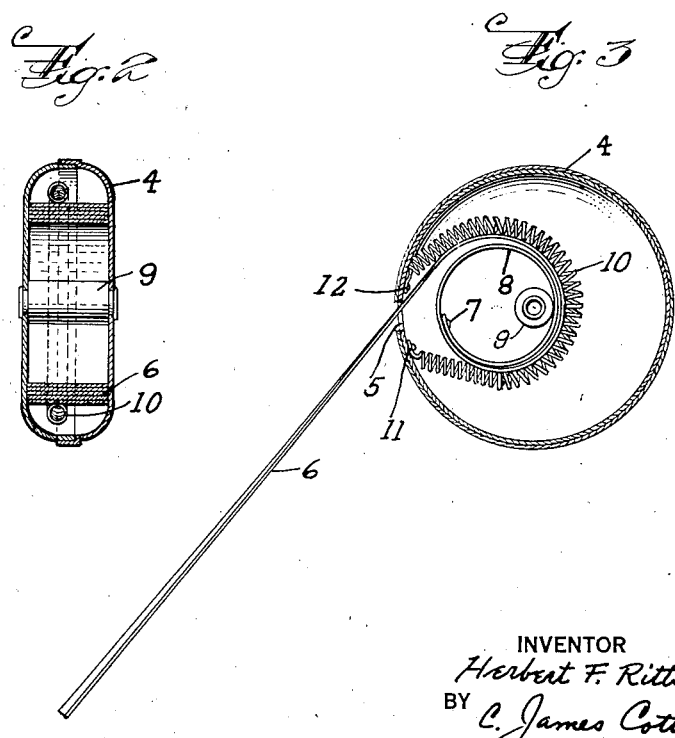
INVENTOR
Herbert F. Ritter
BY C. James Cottrell
ATTORNEY Patented Aug. 13, 1935

2,011,081

UNITED STATES PATENT OFFICE 2,011,081

COILABLE METAL MEASURING TAPE

Herbert F. Ritter, Bogota, N. J.

Application April 9, 1935, Serial No. 15,361

7 Claims. (Cl. 33—138)

This invention relates to coilable metal measuring tapes; and more particularly to coilable metal measuring tapes of the concavo-convex type or other suitable non-planar forms, and being of suitable length, thickness and curvature to be relatively stiff and straight when extended.

Heretofore, coilable metal measuring tapes of the type herein considered have been enclosed in casings and attached to coil springs, which have either a winding or counterbalancing effect upon the tape. In the "push-pull" type of tape, the spring is of insufficient strength to wind the tape, but has a counterbalancing effect upon the concavo-convex tape, so that the tape may be withdrawn manually from the casing and remain unaided at any length to which it may be extended. This form of tape is desirable as it enables an operator to place the tape on a surface and it will remain in the extended position without aid from the operator. However, such "push-pull" tapes are objectionable in that the counter-balancing spring is sensitive and accordingly is expensive and requires great care in the assembling of the concavo-convex tape and spring in the casing.

It is, therefore, an object of this invention to provide a "push-pull" measuring device employing a concavo-convex tape which will remain unaided at any length to which it may be extended without the use of a sensitive counter-balancing spring or a winding spring of any kind.

A further object is the provision of a "push-pull" measuring device employing a concavo-convex tape which has its inner end coiled on itself and fastened to the tape proper to provide a floating drum which is positioned in a casing and in constant engagement with a resilient member expansible in all directions when the tape is fully extended, said resilient member being in constant engagement with subsequent coils of the tapes as the tape is pushed back into the casing.

These and other objects are attained by the novel construction, combination and arrangement of parts hereinafter described and shown in the accompanying drawing, constituting a material part of this disclosure, and in which:

Fig. 1 is a plan view of a measuring device, with a portion of the casing removed, showing the position of the concavo-convex tape and the resilient member when the tape is substantially completely wound into the casing.

Fig. 2 is a sectional view taken on line 2—2 of Fig. 1.

Fig. 3 is a plan view, with the cover of the casing removed, showing the relative positions of the tape and resilient member when the tape is substantially fully extended from the casing.

Referring to the drawing, there is shown a casing 4, having an opening 5 in the peripheral wall thereof through which passes a metal tape 6 of the concavo-convex type or a similar non-planar form. The inner end of the tape 6 is coiled upon itself and attached to the main body of the tape at 7 to provide a drum 8, which floats about a post 9, attached to the casing. Positioned in the casing is a coiled spring 10 which has one end attached to the casing at 11 on one side of the opening 5, and its other end attached to the casing at 12 on the other side of the opening. The spring 10 is of such strength that it at all times engages either the drum 8 or the subsequent coils of the tape 6.

In operation, when the tape is fully extended from the casing, the coiled spring 10 bears against the drum 8. As the tape is wound into the casing, the subsequent coils thereof engage the spring 10, and due to the well known tendency of concavo-convex tapes to straighten out, the subsequent coils thereof are of a greater diameter than the drum 8. However, due to the engagement of spring 10 with the subsequent coils of the tape, said coils have their diameters restricted and the coils are prevented from frictional engagement with the inner wall of the casing, thus preventing jamming and choking of the tape in the casing. Due to the expansibility of the spring 10 in substantially all directions, the pressure on the coils is practically the same at all points, and the force required to push the tape into the casing is relatively uniform throughout the entire length of the tape.

Obviously, the constant pressure of the spring 10 on the coils of the tape serves as a brake to counteract uncoiling tendencies of the tape, without causing undesirable friction to oppose the free movement of the tape when pulled out of or pushed into the casing.

A tape measuring device embodying the features of my invention will remain at any length to which it may be extended without creeping or slipping of any kind; and obviously, such a tape measuring device in which no winding spring is employed can be manufactured at a considerably less cost than "push-pull" tape measuring devices in which a sensitive counter-balancing spring is required.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described my invention, what I claim as new and desire to secure by Letters Patent, is:

1. In a tape measuring device, a casing having a tape opening in its peripheral wall, a resilient tape of normally concavo-convex cross-sectional shape having one end positioned in the casing and coiled upon itself and secured to the tape to provide a drum, the other end of the tape passing through said opening, and a coiled spring positioned in the casing and having its ends attached to the inner peripheral wall of the casing on each side of said opening, said coiled spring being of sufficient strength and length to substantially encircle and bear against the drum when the tape is fully extended and to substantially encircle and engage subsequent coils of the tape constantly when the tape is pushed into the casing.

2. In a tape measuring device, a casing having a tape opening in its peripheral wall, a resilient tape of normally concavo-convex cross-sectional shape having one end positioned in the casing and coiled upon itself and secured to the tape to provide a drum, the other end of the tape passing through said opening, and a resilient member inherently expansible in a plurality of directions positioned in the casing and encircling the coils of the tape, said resilient member having its ends attached to the inner peripheral wall of the casing on each side of said opening, said resilient member being of sufficient strength and length to constantly engage the tape to prevent the coils of the tape from frictionally engaging the peripheral wall of the casing.

3. In a tape measuring device, a casing having a tape opening in its peripheral wall, a resilient tape of normally concavo-convex cross-sectional shape having one end positioned in the casing, and a resilient member inherently expansible in a plurality of directions positioned in the casing, said resilient member having its ends attached to the inner peripheral wall of the casing on each side of said opening, said resilient member being of sufficient strength and length and encircling the coils of the tape to constantly engage the tape to prevent the coils of the tape from frictionally engaging the casing.

4. In a tape measuring device, a casing having a tape opening in its peripheral wall, a resilient tape of normally concavo-convex cross-sectional shape having one end positioned in the casing and coiled upon itself and secured to the tape to provide a drum, the other end of the tape passing through said opening, and a coiled spring positioned in the casing, said coiled spring having its ends attached to the inner peripheral wall of the casing on each side of said opening, said coiled spring encircling the coils of the tape to prevent said coils from frictionally engaging the inner peripheral wall of the casing.

5. In a tape measuring device, a casing having a tape opening in its peripheral wall, a resilient tape of normally concavo-convex cross-sectional shape passing through said opening and having one end thereof positioned in the casing, and a resilient member inherently expansible in a plurality of directions positioned in the casing, said resilient member having its ends attached to the inner peripheral wall of the casing on each side of said opening, said resilient member at all times encircling and engaging the coils of the tape to prevent said coils from frictionally engaging the inner peripheral wall of the casing.

6. In a tape measuring device, a casing having a tape opening in its peripheral wall, a resilient tape of normally non-planar cross-sectional shape passing through said opening and having one end thereof positioned in the casing, and a resilient member inherently expansible simultaneously in a plurality of directions positioned in the casing, said resilient member having its ends attached to the casing on each side of said opening, said resilient member encircling and engaging the coils of the tape to prevent said coils from frictionally engaging the casing.

7. In a tape measuring device, a casing having a tape opening in its peripheral wall, a drum positioned in the casing, a resilient tape of normally concavo-convex cross-sectional shape connected to said drum, the free end of the tape passing through said opening, and a resilient member inherently expansible in a plurality of directions positioned in the casing and encircling the coils of the tape as the tape is wound into the casing, said resilient member having its ends attached to the inner peripheral wall of the casing on each side of said opening, said resilient member being of sufficient length and strength to constantly engage the tape to prevent the coils of the tape from engaging the peripheral wall of the casing.

HERBERT F. RITTER.